US009128977B2

(12) United States Patent
Belanger et al.

(10) Patent No.: US 9,128,977 B2

(45) Date of Patent: *Sep. 8, 2015

(54) ENHANCING EVENT SUMMARIES OF SYNCED ONLINE CONTENT MANAGEMENT SYSTEM INTERACTIONS

(71) Applicant: Dropbox, Inc., San Francisco, CA (US)

(72) Inventors: Maxime Belanger, San Francisco, CA (US); Kyle Consalus, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 13/725,647

(22) Filed: Dec. 21, 2012

(65) Prior Publication Data

US 2014/0181008 A1 Jun. 26, 2014

(51) Int. Cl.

*G06F 17/30* (2006.01)
*G06F 17/24* (2006.01)

(52) U.S. Cl.

CPC .......... *G06F 17/30383* (2013.01); *G06F 17/24* (2013.01); *G06F 17/241* (2013.01); *G06F 17/30002* (2013.01)

(58) Field of Classification Search

CPC . G06F 17/30383; G06F 17/241; G06F 17/24; G06F 17/30002

USPC .......................................................... 707/609

See application file for complete search history.

(56) References Cited

U.S. PATENT DOCUMENTS

| | | | | |
|---|---|---|---|---|
| 2006/0161635 A1* | 7/2006 | Lamkin et al. | ................ | 709/217 |
| 2008/0215964 A1* | 9/2008 | Abrams et al. | ................ | 715/246 |
| 2008/0288499 A1* | 11/2008 | Choi et al. | ........................ | 707/9 |
| 2009/0157608 A1* | 6/2009 | Strathearn et al. | ................ | 707/3 |
| 2009/0216806 A1* | 8/2009 | Feuerstein et al. | ......... | 707/104.1 |
| 2010/0174993 A1* | 7/2010 | Pennington et al. | .......... | 715/738 |
| 2010/0312754 A1* | 12/2010 | Bear et al. | ..................... | 707/685 |
| 2012/0066573 A1* | 3/2012 | Berger et al. | ................. | 715/202 |
| 2012/0191715 A1* | 7/2012 | Ruffner et al. | ................ | 707/738 |
| 2012/0192086 A1* | 7/2012 | Ghods et al. | .................. | 715/753 |
| 2012/0222133 A1* | 8/2012 | Kidron | ............................ | 726/28 |
| 2012/0331568 A1* | 12/2012 | Weinstein et al. | .............. | 726/29 |
| 2013/0014023 A1* | 1/2013 | Lee et al. | ...................... | 715/751 |
| 2013/0080919 A1* | 3/2013 | Kiang et al. | .................. | 715/753 |
| 2013/0110565 A1* | 5/2013 | Means et al. | ................. | 705/7.11 |
| 2013/0173531 A1* | 7/2013 | Rinearson et al. | ............ | 707/608 |
| 2013/0304694 A1* | 11/2013 | Barreto et al. | ................ | 707/608 |

* cited by examiner

*Primary Examiner* — Rehana Perveen
*Assistant Examiner* — Tiffany Thuy Bui
(74) *Attorney, Agent, or Firm* — Novak Druce Connolly Bove + Quigg LLP

(57) ABSTRACT

Disclosed are systems, methods, and computer-readable storage media for enhancing event summaries of synced online content management system interactions. Users can identify one or more of the collapsed events markers that have pointers to the original, uncondensed, event markers. Upon identifying the one or more collapsed event markers, users can add additional data, via the pointers, to the original, uncondensed, event markers that were used to generate the collapsed event marker. The content management system can then perform a new analysis of the shared dataspace, analyzing the event markers using pre-existing data and the newly added data to create additional collapsed event markers, modify previously generated collapsed event markers, or remove/replace collapsed event markers. These enriched collapsed event markers can then newly presented to the user.

12 Claims, 8 Drawing Sheets

Collapsed Event Feed for Bob

302

- On 10/1/12, you added 3 files
- On 10/2/12, James added 1 file and deleted your file Texas.jpg
- On 10/3/12, Mike deleted 1 file and replaced 1 file

| Action (402) | Time (404) | Filename (406) | User (408) |
|---|---|---|---|
| Add | 10/1/12 1:25 PM | Texas.jpg | Bob |
| Add | 10/1/12 1:26 PM | Florida.jpg | Bob |
| Add | 10/1/12 1:27 PM | Alabama.jpg | Bob |
| Delete | 10/2/12 3:01 PM | Texas.jpg | James |
| Add | 10/2/12 9:03 PM | California.jpg | James |
| Replace | 10/3/12 11:30 AM | Florida.jpg | Mike |
| Delete | 10/3/12 11:31 AM | Alabama.jpg | Mike |

Event Marker Feed

| Action | Time | Filename | User | Additional Data |
|---|---|---|---|---|
| Add | 10/1/12 1:25 PM | Texas.jpg | Bob | |
| Add | 10/1/12 1:26 PM | Florida.jpg | Bob | Summer Vacation |
| Add | 10/1/12 1:27 PM | Alabama.jpg | Bob | |
| Delete | 10/2/12 3:01 PM | Texas.jpg | James | |
| Add | 10/2/12 9:03 PM | California.jpg | James | Summer Vacation |
| Replace | 10/3/12 11:30 AM | Florida.jpg | Mike | Summer Vacation |
| Delete | 10/3/12 11:31 AM | Alabama.jpg | Mike | |

Event Marker Feed with Additional Data

Enhanced Collapsed Event Feed for Bob

602
- On 10/1/12, you added 3 files
- On 10/2/12, James added 1 file and deleted your file Texas.jpg
- On 10/3/12, Mike deleted 1 file and replaced 1 file 604
- Yourself, James, and Mike have added photographs from your Summer Vaction

ENHANCING EVENT SUMMARIES OF SYNCED ONLINE CONTENT MANAGEMENT SYSTEM INTERACTIONS

TECHNICAL FIELD

The present disclosure relates to enhancing event summaries of synced online content management system interactions and more specifically to receiving additional information describing interactions with a synced online content management system and presenting an enhanced description of the previous and additional interactions to a user.

BACKGROUND

Digests or compendiums condense or abbreviate data, yielding more efficient reports and descriptions of the data when compared to the "raw" data. For example, a "daily digest" email can take all the emails sent to a listserv or an email address over a 24 hour period and compile them into a single email summarizing the previous 24 hours of listserv/email account activity. Similarly, reports of manufacturing activity can be automated to report the production of specific widgets within a specific time period. Yet another example of a digest are the plot summaries provided at the beginning of television shows, where brief summaries of previous episodes explain continuing plot lines from previous episodes to remind and inform current viewers, making for an improved viewing experience.

When storing data, servers and databases can record every interaction of a user or users with the database, or every file operation executed on behalf of the user. Database managers or other users can then search through these interactions for specific events, such as when a user added or modified a specific file. However, because these lists of interactions can grow to significant size, users parsing through the data are challenged to understand patterns when looking at individual interactions. Where multiple users can be granted access to a database, server, or cloud-based storage space, this storage area can be referred to as a "shared dataspace."

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out hereinafter. These and other features of the disclosure will become more fully apparent from the following description and accompanying drawings, or can be learned by the practice of the principles set forth herein.

Disclosed are systems, methods, and non-transitory computer-readable storage media for enhancing event summaries of synced online content management system interactions by including pointers in system file journals to enriched event description data. Programs and applications can record every interaction with a shared database, with the records of those interactions being named "event markers." Example event markers can include records of the name of a file uploaded to the database, when the file was uploaded, who performed the uploading, the size of the file, where the file was stored, granting of access to the shared dataspace to a particular user, etc. To condense long lists of event markers, systems configured according to this disclosure can search for a commonality shared among several or all of the event markers recorded.

Using the commonality to create a collapsed event marker, the system can store and/or present the condensed event markers to users, who can then analyze the summarized data with the event markers in the more manageable, condensed, format. Users can then identify one or more of the collapsed events markers, which have pointers to the original, uncondensed, event markers. Upon identifying the one or more collapsed event markers, users can add additional data, via the pointers, to the original, uncondensed, event markers that were used to generate the collapsed event marker. The system can then perform a new analysis of the shared dataspace, analyzing the event markers using pre-existing data and the newly added data to create additional collapsed event markers, modify previously generated collapsed event markers, or remove/replace collapsed event markers. These enriched collapsed event markers can then be newly presented to the user. The system can present event markers to the user via a popup notification on a desktop or mobile computing device, via email, via an entry in an event log, and so forth.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 shows an example of a collapsed event marker feed;

FIG. 4 shows an example of an event marker feed;

FIG. 5 shows an example of an event marker feed containing additional data;

FIG. 6 shows an example of an enriched collapsed event marker feed;

DETAILED DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The disclosed technology addresses the need in the art for enhancing collapsed, or condensed, event markers in a synced online content management system by including pointers in system file journals to enriched event description data.

Figure 1:
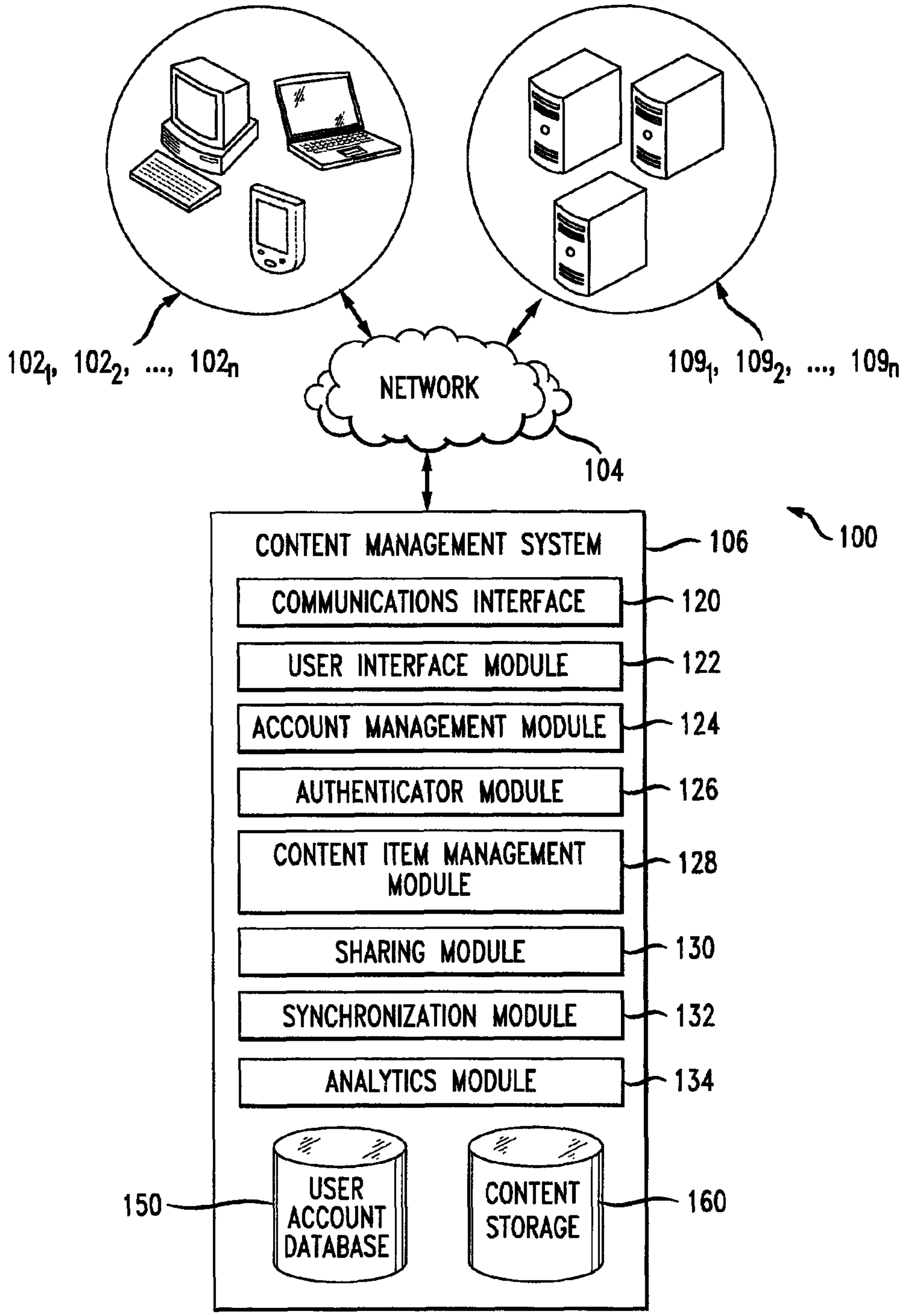
FIG. 1 shows an exemplary configuration of devices and a network in accordance with the invention.

An exemplary system configuration 100 is shown in FIG. 1, wherein electronic devices communicate via a network for purposes of exchanging content and other data. System 100 can be configured for use on a wide area network such as that shown in FIG. 1. However, the present principles are applicable to a wide variety of network configurations that facilitate the intercommunication of electronic devices, such as a local area network, wireless network, etc. For example, each of the components of system 100 in FIG. 1 can be implemented in a localized or distributed fashion in a network.

In system 100, a user can interact with content management system 106 through client devices $\mathbf{102}_1, \mathbf{102}_2, \ldots, \mathbf{102}_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $\mathbf{102}_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $\mathbf{102}_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $\mathbf{102}_i$ can upload content to content management system 106 via network 104. The content can later be retrieved from content management system 106 using the same client device $\mathbf{102}_i$ or some other client device $\mathbf{102}_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $\mathbf{102}_i$. However, content management system 106 can store the content items in its own order, arrangement, or hierarchy. Content management system 106 can store the content items in a network accessible storage (SAN) device, in a redundant array of independent disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $\mathbf{102}_i$ can include client software, which synchronizes, via a synchronization module 132 at content management system 106, content in client device $\mathbf{102}_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $\mathbf{102}_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $\mathbf{109}_1$, $\mathbf{109}_2$, . . . , $\mathbf{109}_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can include a content management module 128 for maintaining a content directory. The content directory can identify the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible. For example, content management system 106 can include an event processing module and/or a notifications module.

Figure 2:
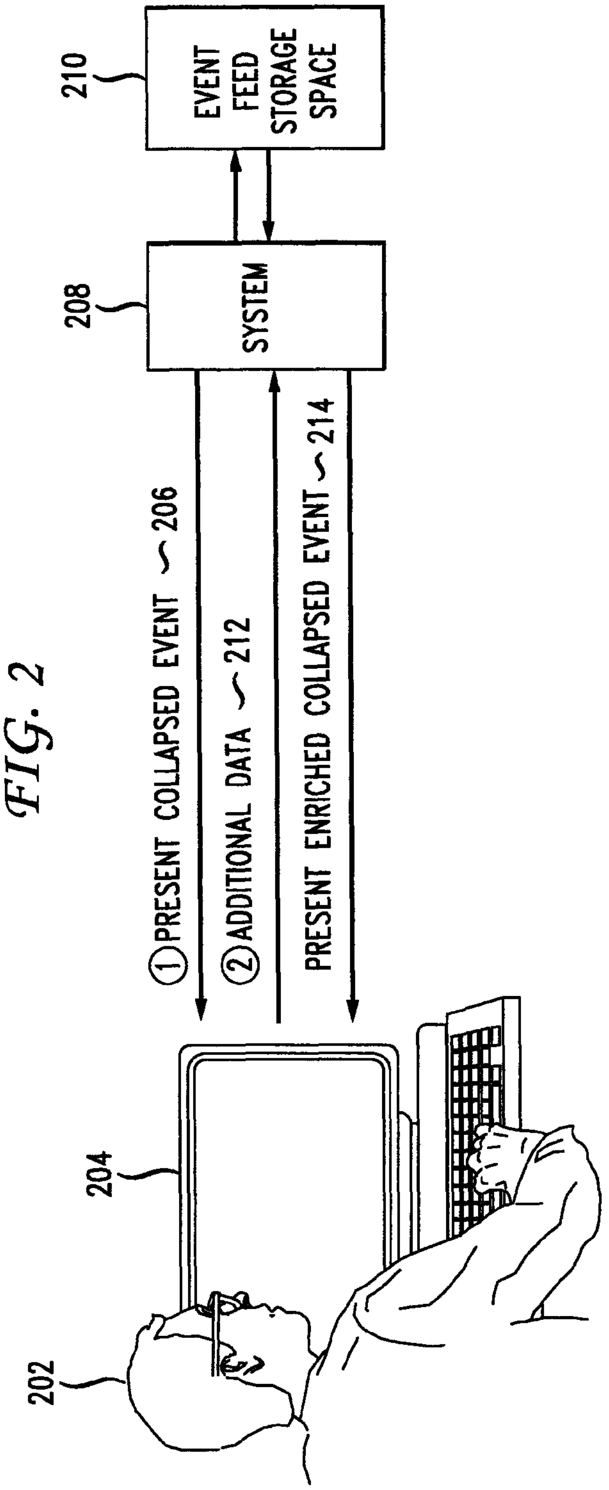
FIG. 2 shows an example of user interaction with an example system embodiment.

Having disclosed some system components, the disclosure now turns to FIG. 2, which shows an example of user interaction with a synced online content management system, or system 208. As shown, user 202 using processing device 204, such as a computer, terminal, or other computing device interacts with system 208 providing synced online content management services. In certain configurations, system 208 can represent a program, module, or specific piece of software within the computer. In other configurations, system 208 is a separate computing device connected by a network or other communication link with computer 204.

As user 202 interacts with system 208 via computing device 204, system 208 can present collapsed events 206 to user 202. These collapsed events can represent a summary, or a condensed version, of interactions with a shared dataspace by one or more users. For example, as users add, delete, modify, or rename files stored in an content management system capable of being shared amongst multiple users (a “shared dataspace”), each interaction can recorded. These records of the interactions, also called event markers, can then analyzed and condensed by system 208, creating collapsed event markers.

As user 202 reviews the collapsed event markers, user 202 can determine that the collapsed event markers, or the underlying “original” event markers, could be better described or organized by additional data associated with the event markers. In certain configurations, the user can directly review the “raw” event marker data, without first previewing the collapsed event marker, and likewise determine that the raw event marker is lacking data. User 202 can then communicate additional data 212 to system 208, which system 208 can then append to the original event markers stored in event feed storage space 210. Event feed storage space 210 can be a physically distinct storage space from system 208, or can be a separate module of system 208. System 208 can then perform a new analysis of the event markers, condensing event markers based on common factors or thresholds using both the original data associated with the event markers and the additional data supplied by the user. These newly condensed event markers represent “enriched” collapsed events, because they are based on both the original and supplemental data. System 208 can then present enriched collapsed events 214 to user 202.

In an alternate variation, system 208 can determine, collect, or gather additional data 212 without any direct user interaction. For example, system 208 can analyze a user’s interactions with the contents described by the event marker feed, such as a message sent with a sharing request, and deduce certain pieces of information therefrom. System 208 can look up data from other sources, such as a social network or email account, to provide additional data to enrich the description of the event feed.

FIG. 3 shows an example of a collapsed event marker feed. In this example, the feed contains a variety of collapsed event markers 302. Each collapsed event marker 302 can describe interactions recorded in an event marker feed that records every interaction or every file operations in a shared dataspace. In this example, each collapsed event marker is organized by the day on which the associated actions were performed. In other configurations the collapsed event markers can be organized and condensed based on the type of interactions, interactions with specific files, or any additional information recorded in the event marker feed. How content management system 106 determines to condense event marker feeds can be predetermined, or can be customized based on user preferences, circumstantial needs, and/or system requirements.

As content management system 106 condenses the event markers into a list of collapsed event markers, content management system 106 may determine a quantity of event markers to merge into a single collapsed event. This determination can be based on a level of granularity content management system 106 wishes to convey to future users. For instance, content management system 106 that reduces an event marker feed of 1,000 event markers to 5 collapsed event markers has a finer granularity than content management system 106 that condenses the 1,000 event markers to 20 collapsed event markers. While some systems can rely on relative comparisons of granularity (fine-grained or course-grained) other systems can quantify the levels of granularity based on specific numbers of percentages. One example of this could be determining the granularity based on the maximum number of event markers which can be combined in a given collapsed event, whereas other forms of determining granularity can be based on the number of collapsed events visible on a monitor/display at a given time.

In yet other examples, the granularity can be determined based on the amount of time between interactions. Therefore, in one configuration content management system 106 could condense any interactions with the shared dataspace that occur within 15 minutes of one another, whereas in other configurations it could condense every interaction that occur within an hour, a day, or other time periods. The granularity can also be based on classifications of certain users. If Bob, James, and Mike were all co-workers, where Mike was a supervisor of Bob and James, the interactions of Bob and James might be condensed together, with Mike’s interactions condensed separately. Yet other configurations can condense the feed in multiple ways or using multiple common factors or attributes. Thus the collapsed event markers can be organized both by the user who interacted with the shared dataspace and the type of action performed, or any other combination of factors or attributes. Content management system 106 can collapse, condense, or summarize all events or file operations, or a subset thereof. In some instances, the event log of file operations can contain many single file operations that are not combinable or collapsible with others. However, content management system 106 can still apply an enriched description to a single event that is not condensed or combined with other events.

The condensed feeds can be generated for a specific individual, or can be generic in nature. As shown, collapsed event feed 300 is specifically generated for Bob. Bob can have user preferences stored that pre-determine the granularity of the collapsed event markers, how often the collapsed event markers are determined, what attributes are used to condense the event marker feed, and who has access to the collapsed event marker feed. Should Mike, James, or another user attempt to view the collapsed event marker feed, the listed collapsed event markers could be organized differently based on user preferences for that user. In this way, the system can store more than one set of collapsed event markers, or can generate the collapsed event markers separately in an on-demand configuration, waiting to create the collapsed event marker feed until requested or accessed by a user.

FIG. 4 shows an example of an event marker feed. Event marker feed 400 is associated with a shared dataspace or storage space provided by synched online content management system, such as described in FIG. 1, and shows example event markers for the collapsed event feed shown in FIG. 3. This shared dataspace can be accessible by a single individual, or can be shared among multiple people or groups. As the user or users interact with the shared dataspace, each interaction can be recorded in the event marker feed 400.

Each row in the event marker feed can represent a file operation, activity, or interaction with the shared dataspace by a user. Example interactions can include, but are not limited to, adding a file, deleting a file, modifying a file, renaming a file, granting a user access to the shared dataspace, removing a user's access to the shared dataspace, granting a user administrative rights in the shared dataspace, making a file public, and making a directory public. For example, consider the interactions of Bob with the shared dataspace. Bob uploads, or adds, three files on Oct. 1, 2012 within two minutes—Texas.jpg, Florida.jpg, and Alabama.jpg. These interactions are recorded as event markers, where the event marker can describe the interaction by recording the type of activity 402, when the interaction takes place ("Time") 404, what file or directory was interacted with ("Filename") 406, and/or who performed the interaction ("User") 408. As shown, each event marker occupies a separate row in the event marker feed 400, however, other configurations can have event markers organized into columns, separate records or structures, chained together using pointers, or other programming/data management techniques for organizing multiple event markers.

As other users having access to the shared dataspace interact with the database, content management system 106 can record their actions as well. As shown in FIG. 4, the interactions of James and Mike are recorded after Bob's interactions. However, while example event marker feed 400 only shows 7 interactions, other feeds can have hundreds, thousands, millions, or more interactions recorded as event markers. Whereas analyzing the illustrated 7 event markers is relatively simple, analyzing thousands or millions of interactions can be cumbersome without means for automating the analysis and providing meaningful summaries of the interactions.

Systems configured according to this disclosure can provide users the capability to provide additional data to the records of interactions, thereby updating the event marker feed with additional data fields. FIG. 5 shows exemplary event marker feed containing additional data 500. Event marker feed 500 can contain the same data 502 shown in FIG. 4, but can contain additional column of data 504. In column 504 the user has added specific event data as pertaining to a "summer vacation" but in other variations content management system 106 can generate or compile the additional descriptive information without direct user input.

Enhanced event marker feed 500 can have a single additional column, or can have multiple columns. In addition, the additional data can depend on relationships with other data found in the event marker record. For instance, one column could be a binary indication of a "vacation," and only if that column indicates that the event marker is related to a vacation could a second column contain additional data describing a location where the vacation took place. In addition, if this event marker example has an additional column for "work trips," which is binary in nature, and a column dependent from work trips, which describes the location of the work trips, the data from work trips and vacations can be correlated and condensed for a collapsed event marker. Interactions with the shared dataspace where photographs of Boston were added, where the photographs were taken during separate vacation and work trips, could be collapsed together, creating a collapsed event describing the addition of photographs of Boston. In another configuration, additional data can reflect modifications to data or files over a given time period. Other forms of additional data that can be recorded can include a label, additional metadata, additional source information, a location of a user during upload/download/modification, and a time of file origination.

Other configurations can obtain the additional data without direct influence from a user of the shared dataspace. For example, a system administrator could determine that future event markers would record the additional event field "language," indicating the language of the user interacting with the shared dataspace in a given interaction. The system administrator might then fill in specific language fields based on previous interactions of a user and the shared dataspace.

After receiving additional data, content management system 106 can then perform a new analysis of the event markers using the additional data alongside the previous event marker data, yielding "enriched" collapsed event feed markers. FIG. 6 shows exemplary enriched collapsed event feed marker 600. In this example, three of collapsed event feed markers 602 are identical to those available prior to a user providing additional data. However, fourth collapsed event marker 604 describes the additional data associated with the events. In this case, because the additional data of FIG. 5 indicates that pictures added were of a summer vacation, enriched collapsed feed 600 can provide a collapsed event marker 604 indicating the addition of summer vacation photographs.

Depending on a particular configuration, content management system 106 can include in the event log "Between Oct. 1, 2012 and Oct 3, 2012, Bob, Mike, and James added photographs concerning a summer vacation." If the enriched collapsed marker is generated for a specific individual, additional customization may exist. Additionally, as with an "unenriched" collapsed event marker, the enriched collapsed event markers can be generated using specific commonalities and thresholds determined by users, circumstances, system requirements, or system settings.

Figure 7:
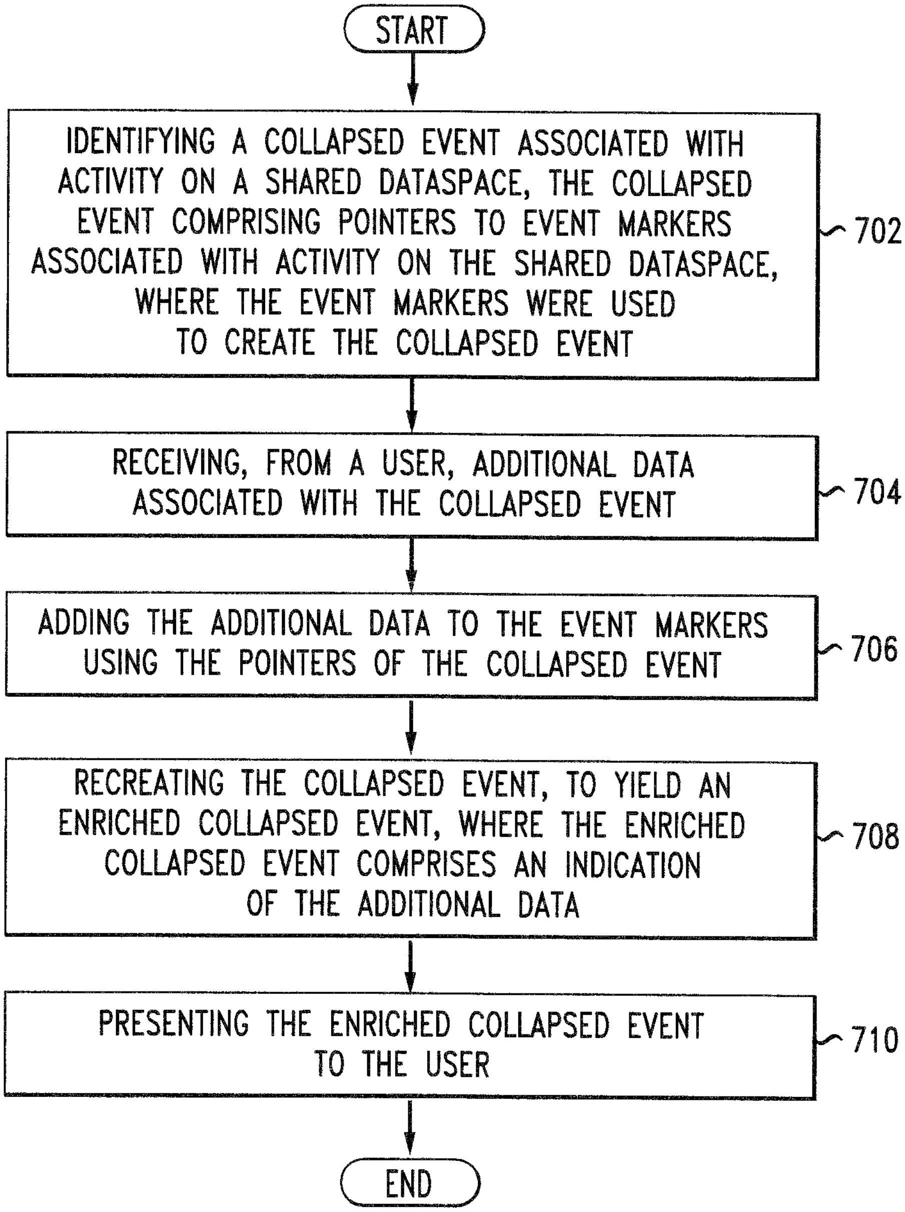
FIG. 7 shows an example method embodiment.

Having disclosed some basic system components and concepts, the disclosure now turns to the example method embodiment shown in FIG. 7. For the sake of clarity, the method is described in terms of exemplary content management system 106 as shown in FIG. 1 configured to practice the method. The steps outlined herein are examples and can be implemented in any combination thereof, including combinations that exclude, add, or modify certain steps.

Content management system 106 can first identify a collapsed event associated with activity on a shared dataspace, the collapsed event having pointers to event markers associated with activity on the shared dataspace, where the event markers were used to create the collapsed event (702). Example activities used to create collapsed events can include adding a file, deleting a file, modifying a file, renaming a file, granting a user access to the shared dataspace, removing a user's access to the shared dataspace, granting a user administrative rights in the shared dataspace, making a file public, and making a directory public. Content management system 106 can then receive, from a user, additional data associated with the collapsed event (704). Such additional data can include a label, additional source information, a location of a user who performed the interaction with the shared dataspace, and an origin of the data being manipulated. Content management system 106 can add the additional data to the event markers using the pointers of the collapsed event (706). That is, in many configurations, rather than allowing users to directly manipulate the actual event markers previously recorded, content management system 106 can use pointers located in the collapsed feed to "forward" the additional data to the proper location in the list of event markers, thereby protecting the original data and yet allowing for increased customization as well as an improved ability to condense large amounts of data.

Having received the additional data from the user, content management system 106 can recreate the collapsed event, to yield an enriched collapsed event, where the enriched collapsed event can include an indication of the additional data (708). Content management system 106 can use, based on the additional data, additional event markers that were not included in the previous "collapsing" analysis. Consider the circumstance where a user has uploaded, at different times, a number of files named "My favorite city," "A great weekend," "Best friends forever," as well as several Italian books. However, during the subsequent condensing analysis the Italian books and the separate files were not correlated, and in the collapsed event feed the correlation between the books and the files was not made. The user later provides additional data, indicating that the 3 files were associated with a trip to Rome. Content management system 106 can recognize that Rome and Italian are closely related and provide an enriched collapsed event marker indicating the correlation.

Content management system 106 can then present the enriched collapsed event to the user (710). This presentation can occur via a software client, a log, or other acceptable means for communicating data to a user. In addition, content management system 106 can prepare a notification describing the enriched collapsed event, and then present that notification to an additional user of the shared dataspace. This notification preparation can be directly tied to a threshold that the enriched collapsed event must meet. An example of such a threshold could be "A notification will not be sent to Jerry unless 5 event markers associated with Jerry receive additional data." When 5 event markers receive additional data, the threshold is met, and a notification can be generated and presented to Jerry.

Figure 8A:
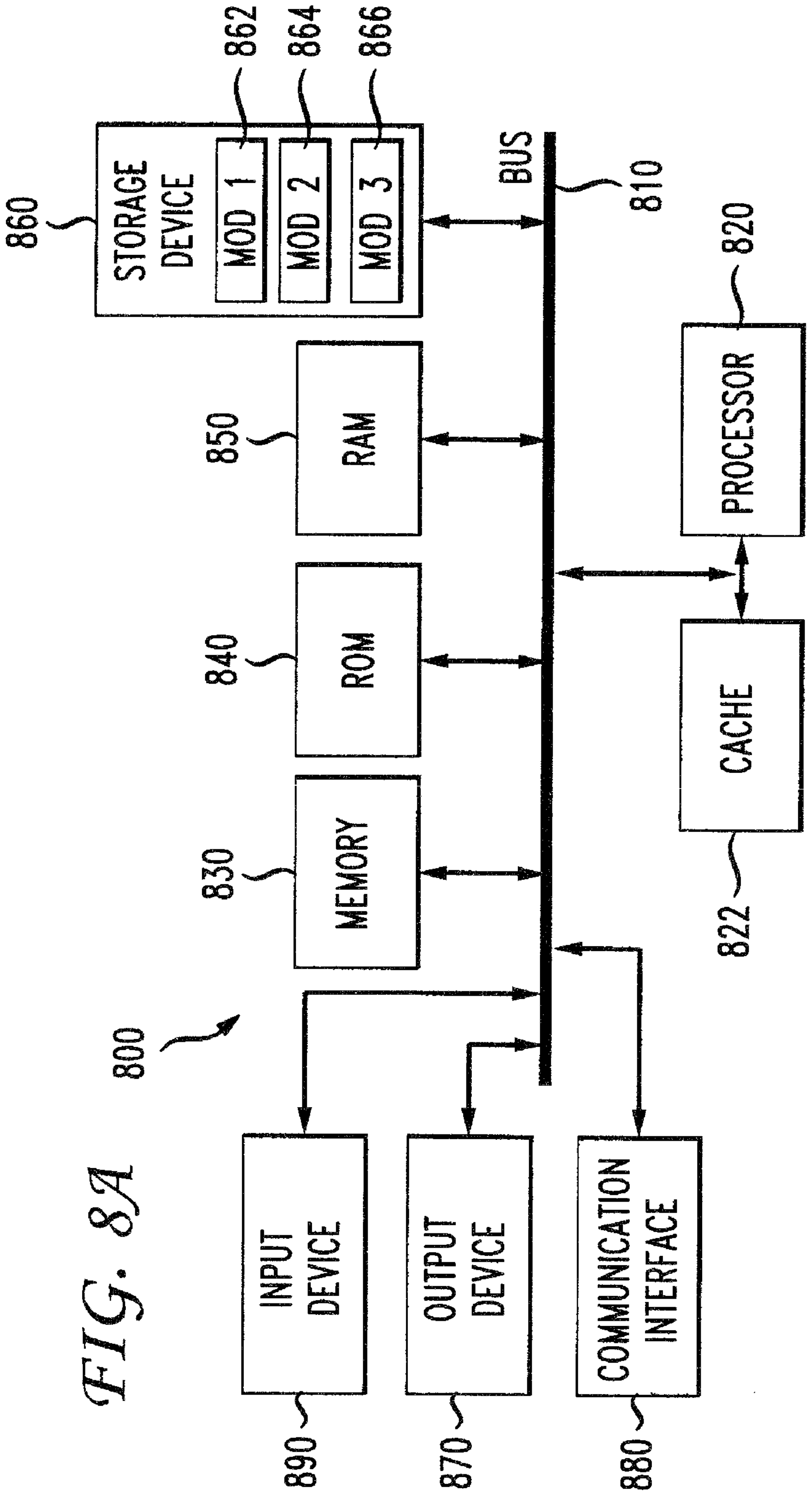
FIG. 8A shows a conventional system bus computing system architecture.
Figure 8B:
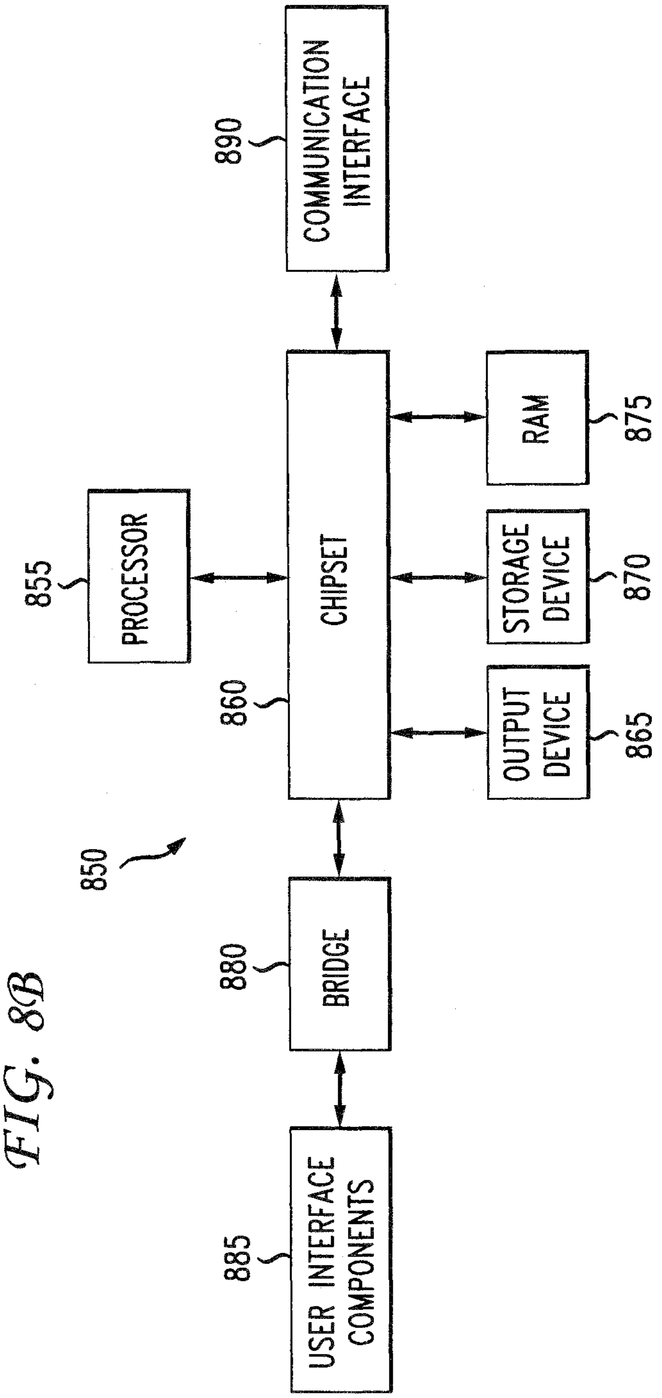
FIG. 8B shows a computer system having a chipset architecture.

FIG. 8A, and FIG. 8B show exemplary possible system embodiments. The more appropriate embodiment will be apparent to those of ordinary skill in the art when practicing the present technology. Persons of ordinary skill in the art will also readily appreciate that other system embodiments are possible.

FIG. 8A shows a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B shows a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that exemplary systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A computer-implemented method comprising:

presenting to a user, by a processor, a collapsed event associated with content item activity on a shared dataspace, the collapsed event is associated with at least two event markers based on at least one commonality between at least two items of information;

receiving from a user, by a processor, additional data to be associated with the collapsed event;

adding, by a processor, the additional data to the event markers;

updating, by a processor, the collapsed event using the added additional data, to yield an enriched collapsed event including the additional data; and presenting by a processor, the enriched collapsed event to the user;

preparing, by a processor, a notification describing the enriched collapsed event; and presenting, by a processor, the notification to an additional user of the shared dataspace, wherein preparing and presenting of the notification only occur when a threshold associated with the enriched collapsed event is met, and wherein the activity associated with each event marker comprises at least one file interaction with the file interaction comprising at least one of adding a file, deleting a file, moving a file, renaming a file, providing a user access to the shared dataspace, limiting access to the shared dataspace to a user, making a file public, making a directory public, or restricting public access to the shared dataspace.

2. The method of claim 1, wherein the additional data comprises at least one of a label, source information, and a time of origin.

3. The method of claim 1, wherein updating of the collapsed event further comprises merging a portion of the event markers with additional event markers to recreate the collapsed event based on the additional data, where the additional event markers were not used for the collapsed event.

4. The method of claim 1, wherein the presenting of the enriched collapsed event occurs via at least one of a software client and a log.

5. A system comprising:

a processor; and a non-transitory computer-readable storage medium having processor-executable instructions stored therein for causing a processor to:

present to a user a collapsed event associated with content item activity on a shared dataspace, the collapsed event is associated with at least two event markers based on at least one commonality between at least two items of information;

receive from a user additional data to be associated with the collapsed event;

add the additional data to the event markers;

update the collapsed event using the added additional data, to yield an enriched collapsed event including the additional data; and present the enriched collapsed event to the user;

prepare a notification describing the enriched collapsed event; and present the notification to an additional user of the shared dataspace, wherein the prepare and present the notification only occur when a threshold associated with the enriched collapsed event is met, and wherein the activity associated with each event marker comprises at least one file interaction with the file interaction comprising at least one of adding a file, deleting a file, moving a file, renaming a file, providing a user access to the shared dataspace, limiting access to the shared dataspace to a user, making a file public, making a directory public, or restricting public access to the shared dataspace.

6. The system of claim 5, wherein the additional data comprises at least one of a label, source information, and a time of origin.

7. The system of claim 5, wherein updating of the collapsed event further comprises merging a portion of the event markers with additional event markers to recreate the collapsed event based on the additional data, where the additional event markers were not used for the collapsed event.

8. The system of claim 5, wherein the presenting of the enriched collapsed event occurs via at least one of a software client and a log.

9. A non-transitory computer-readable storage medium having processor-executable instructions stored therein for causing a processor to:

present to a user a collapsed event associated with content item activity on a shared dataspace, the collapsed event is associated with at least two event markers based on at least one commonality between at least two items of information;

receive from a user additional data to be associated with the collapsed event;

add the additional data to the event markers;

update the collapsed event using the added additional data, to yield an enriched collapsed event including the additional data; and present the enriched collapsed event to the user;

prepare a notification describing the enriched collapsed event; and present the notification to an additional user of the shared dataspace, wherein prepare and present the notification only occur when a threshold associated with the enriched collapsed event is met, and wherein the activity associated with each event marker comprises at least one file interaction with the file interaction comprising at least one of adding a file, deleting a file, moving a file, renaming a file, providing a user access to the shared dataspace, limiting access to the shared dataspace to a user, making a file public, making a directory public, or restricting public access to the shared dataspace.

10. The non-transitory computer-readable storage medium of claim 9, wherein the additional data comprises at least one of a label, source information, and a time of origin.

11. The non-transitory computer-readable storage medium of claim 9, wherein updating of the collapsed event further comprises merging a portion of the event markers with additional event markers to recreate the collapsed event based on the additional data, where the additional event markers were not used for the collapsed event.

12. The non-transitory computer-readable storage medium of claim 9, wherein the presenting of the enriched collapsed event occurs via at least one of a software client and a log.

* * * * *